US012562124B2

(12) United States Patent
Cho et al.

(10) Patent No.: US 12,562,124 B2
(45) Date of Patent: Feb. 24, 2026

(54) DISPLAY DEVICE

(71) Applicant: LG Display Co., Ltd., Seoul (KR)

(72) Inventors: Min Gi Cho, Paju-si (KR); Dong Won Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/945,296

(22) Filed: Nov. 12, 2024

(65) Prior Publication Data

US 2025/0218381 A1 Jul. 3, 2025

(30) Foreign Application Priority Data

Dec. 29, 2023 (KR) ........................ 10-2023-0197871

(51) Int. Cl.
*G09G 3/3258* (2016.01)

(52) U.S. Cl.
CPC ... *G09G 3/3258* (2013.01); *G09G 2300/0842* (2013.01); *G09G 2310/08* (2013.01); *G09G 2320/041* (2013.01); *G09G 2320/046* (2013.01); *G09G 2330/021* (2013.01); *G09G 2330/045* (2013.01)

(58) Field of Classification Search
None
See application file for complete search history.

(56) References Cited

U.S. PATENT DOCUMENTS

2007/0085813 A1 4/2007 Lee
2012/0212466 A1* 8/2012 Kohtoku .................. H04N 5/66 345/207
2024/0405188 A1* 12/2024 Isono .................. H01L 25/0753

FOREIGN PATENT DOCUMENTS

KR 20-0197525 Y1 9/2000
KR 10-2007-0042421 A 4/2007
KR 10-2007-0056857 A 6/2007

* cited by examiner

*Primary Examiner* — Christopher J Kohlman
(74) *Attorney, Agent, or Firm* — Morgan, Lewis & Bockius LLP

(57) ABSTRACT

A display device includes a display panel configured to display an image, a plurality of cooling elements disposed in a matrix form to cool the heat generated by the display panel, a driver configured to drive the display panel and the cooling elements, and a timing controller configured to control the driver, wherein the timing controller is further configured to extract a data value for each area of the display panel based on a data signal and to generate a control signal for driving the cooling elements based on the data value.

12 Claims, 11 Drawing Sheets

DISPLAY DEVICE

This application claims the benefit of and priority to Korean Patent Application No. 10-2023-0197871, filed on Dec. 29, 2023, which is hereby incorporated by reference as if fully set forth herein.

BACKGROUND

Field

The present disclosure relates to a display device.

Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

Each of the above display devices includes a display panel including subpixels, a driver configured to output a driving signal for driving of the display panel, and a power supply configured to generate power to be supplied to the display panel or the driver.

In such a display device, when driving signals, for example, scan signals and data signals, are supplied to subpixels formed in a display panel, a selected one of the subpixels may transmit light therethrough or may directly emit light, thereby displaying an image.

SUMMARY

Accordingly, the present disclosure is directed to a display device that substantially obviates one or more problems due to limitations and disadvantages of the related art.

The present disclosure may not only improve operating reliability of a display panel by reducing heat generation and burn-in problems of the display panel, but also increase maximum luminance based on heat reduction and minimize or reduce power consumption based on an efficient cooling method.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel configured to display an image, a plurality of cooling elements disposed in a matrix form to cool the heat generated by the display panel, a driver configured to drive the display panel and the cooling elements, and a timing controller configured to control the driver, wherein the timing controller is further configured to extract a data value for each area of the display panel based on a data signal and to generate a control signal for driving the cooling elements based on the data value.

The driver may separately drive the cooling elements for each area based on the control signal supplied from the timing controller.

Driving intensity of the cooling elements for performing a cooling function may be varied in response to the data signal.

The cooling elements may be located on a cooling panel corresponding to the display panel.

The cooling panel may include a first transistor configured to transmit a driving voltage in response to a selection signal, a capacitor charged with the driving voltage, a second transistor configured to operate based on the driving voltage stored in the capacitor and generate a driving current, and a plurality of cooling pixels respectively including the cooling elements configured to perform a cooling function in response to the driving current generated by the second transistor, the cooling pixels being disposed in the matrix form.

The first transistor may have a first electrode connected to a first driving line configured to transmit the driving voltage, a second electrode connected to a gate electrode of the second transistor, and a gate electrode connected to a second driving line configured to transmit the selection signal. The capacitor may have a first electrode connected to the second electrode of the first transistor and the gate electrode of the second transistor, and a second electrode connected to a second electrode of the second transistor and a first electrode of a cooling element among the cooling elements. The second transistor may have a first electrode connected to a first voltage line configured to transmit a first voltage, a second electrode connected to the first electrode of the cooling element, and the gate electrode connected to the second electrode of the first transistor. The cooling element may have the first electrode connected to the second electrode of the second transistor and the second electrode of the capacitor, and a second electrode connected to a second voltage line configured to transmit a second voltage lower than the first voltage.

In another aspect of the present disclosure, a display device includes a display panel including a pixel configured to display an image, a cooling element included in the pixel, a driver configured to drive the display panel and the cooling element, and a timing controller configured to control the driver.

The cooling element may be located between a low-potential voltage line configured to transmit a low-potential voltage to the pixel and a driving signal line configured to transmit a driving voltage generated based on the control signal.

Driving intensity of the cooling element for performing a cooling function may be varied in response to the data signal.

The cooling element may perform a cooling function based on a negative driving voltage output from the driver.

The negative driving voltage may be varied in response to the data signal.

It is to be understood that both the foregoing general description and the following detailed description of the present disclosure are by way of example and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principles of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
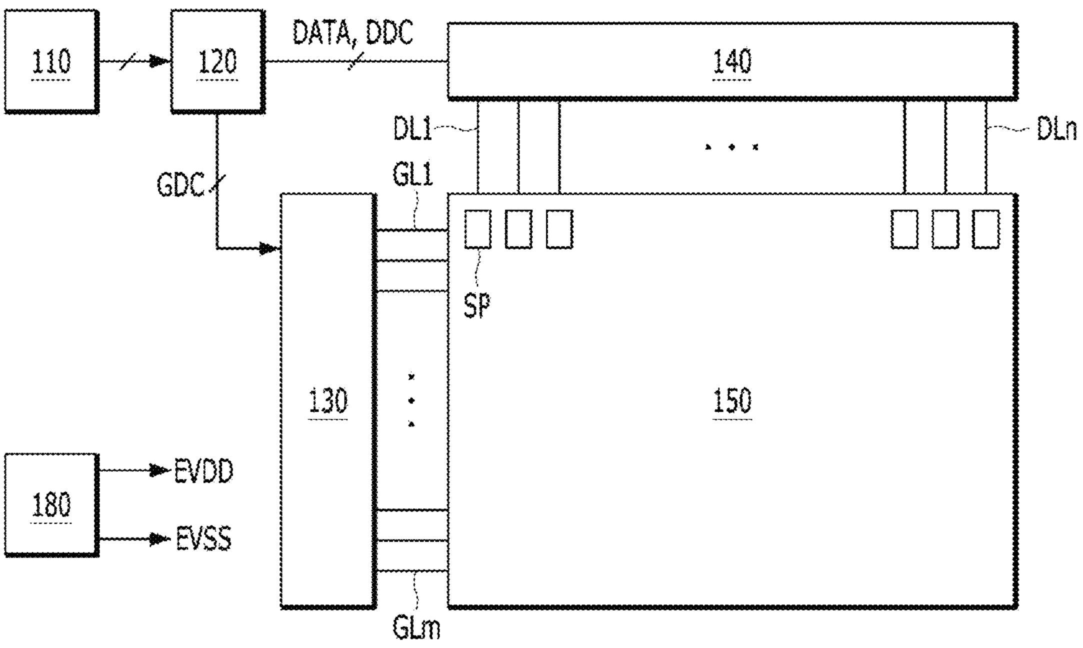
FIG. 1 is a block diagram schematically illustrating an LED device according to example embodiments of the present disclosure.
Figure 2:
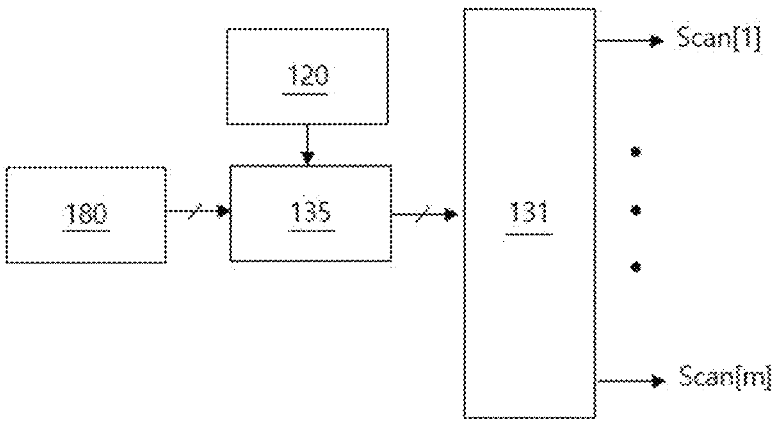
FIGS. 2 and 3 are diagrams for describing example configurations of a GIP-type scan driver.
Figure 3:
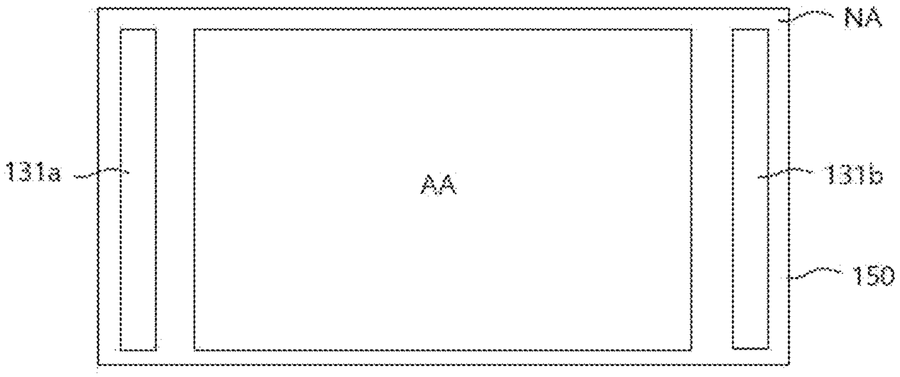
Figure 4:
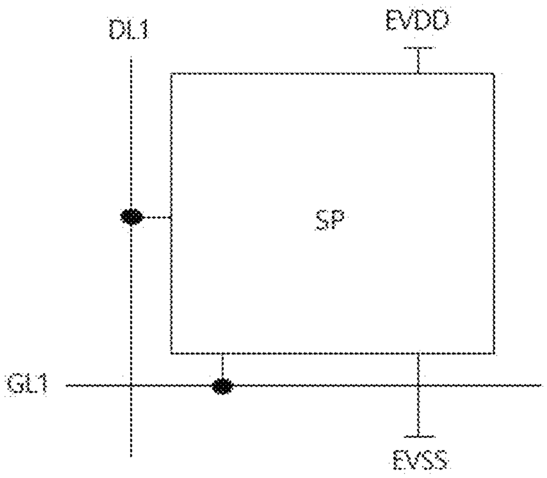
FIG. 4 is an example diagram of a subpixel in FIG. 1.

FIG. 1 is a block diagram schematically illustrating an LED device according to example embodiments of the present disclosure, FIGS. 2 and 3 are diagrams for describing example configurations of a GIP-type scan driver, and FIG. 4 is an example diagram of a subpixel in FIG. 1.

As illustrated in FIGS. 1 to 4, the LED device may include an image supply 110, a timing controller 120, a scan driver 130, a data driver 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, various synchronization signals (a vertical synchronization signal Vsync and a horizontal synchronization signal Hsync), etc. The timing controller 120 may supply a data signal DATA supplied from the image supply 110 together with the data timing control signal DDC to the data driver 140. The timing controller 120 may take the form of an integrated circuit IC and be mounted on a printed circuit board, but is not limited thereto.

The scan driver 130 may output a scan signal (or scan voltage) in response to the gate timing control signal GDC supplied from the timing controller 120. The scan driver 130 may supply the scan signal to each of subpixels included in the display panel 150 through gate lines GL1 to GLm. The scan driver 130 may take the form of an IC or may be formed directly on the display panel 150 in a GIP manner, but is not limited thereto. However, hereinafter, for convenience of description, a GIP-type scan driver will be described as an example.

As illustrated in FIGS. 2 and 3, the GIP-type scan driver 130 may include a level shifter 135 and shift registers 131*a* and 131*b*. The level shifter 135 may generate signals necessary to drive the shift registers 131*a* and 131*b* based on signals and voltages output from the timing controller 120 and the power supply 180. The shift registers 131*a* and 131*b* may be formed in a thin film form in a non-active area NA of the display panel 150 using a GIP method. The shift registers 131*a* and 131*b* may output scan signals Scan [1] to Scan [m] capable of turning on or turning off a transistor formed in an active area AA of the display panel 150.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply data voltages to the subpixels included in the display panel 150 through data lines DL1 to DLn. The data driver 140 may take the form of an IC and be mounted on the display panel 150 or on the printed circuit board, but is not limited thereto.

The power supply 180 may generate a high-potential voltage and a low-potential voltage based on an external input voltage supplied from the outside and output the high-potential voltage and the low-potential voltage through a high-potential voltage line EVDD and a low-potential voltage line EVSS. The power supply 180 may generate and output not only the high-potential voltage and the low-potential voltage, but also a voltage (for example, a gate high potential and a gate low voltage) to drive the scan driver 130 or a voltage (for example, a drain voltage and a half drain voltage) to drive the data driver 140.

The display panel 150 may be manufactured based on a rigid or flexible substrate of glass, silicon, polyimide, etc. The display panel 150 may include a plurality of subpixels SP for displaying an image based on a scan signal, a driving signal including a data voltage, a high-potential voltage, a low-potential voltage, etc. As in FIG. 4, the subpixels SP may be connected to the first data line DL1, the first gate line GL1, the high-potential voltage line EVDD, and the low-potential voltage line EVSS. The subpixels SP may directly emit light. The subpixel SP may emit light of one of colors of red, green, blue, white, etc.

Meanwhile, the timing controller 120, the scan driver 130, the data driver 140, etc., have been described above as having individual configurations. However, one or more of the timing controller 120, the scan driver 130, and the data driver 140 may be integrated into one IC depending on the implementation scheme of the LED device.

Figure 5:
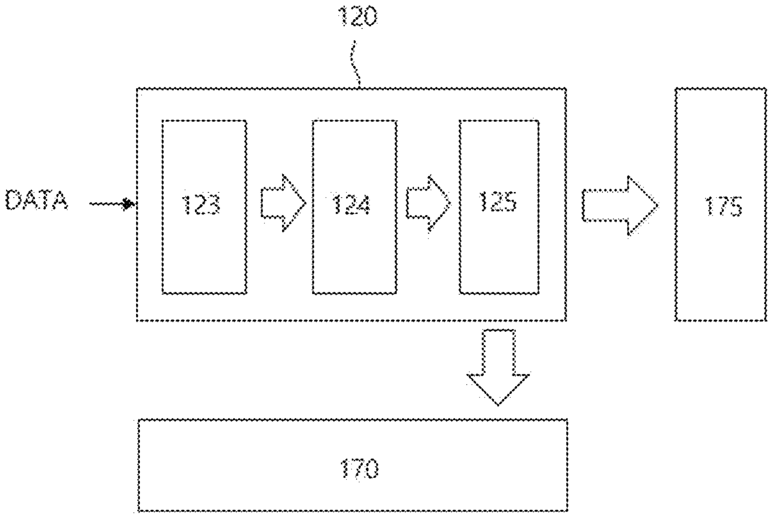
FIG. 5 is a block diagram illustrating a cooling element driver according to a first example embodiment.
Figure 6:
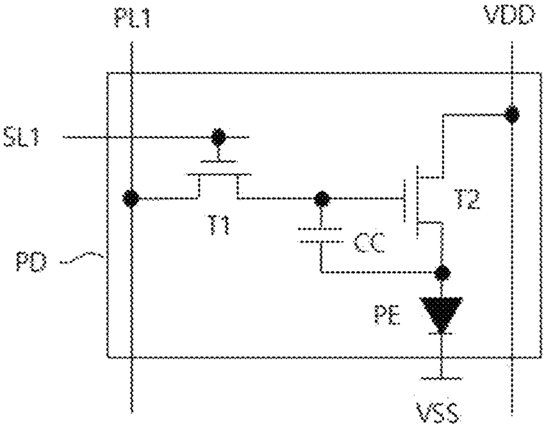
FIG. 6 is a circuit diagram illustrating an example cooling pixel according to the first example embodiment.
Figure 7:
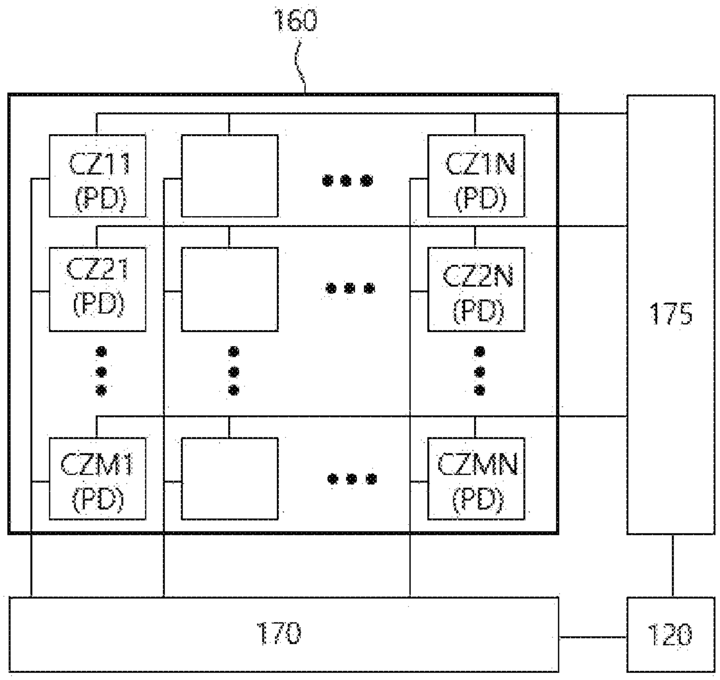
FIG. 7 is a block diagram illustrating a cooling panel and a driver thereof according to the first example embodiment.

FIG. 5 is a block diagram illustrating a cooling element driver according to a first example embodiment, FIG. 6 is a circuit diagram illustrating an example cooling pixel according to the first embodiment, and FIG. 7 is a block diagram illustrating a cooling panel and a driver thereof according to the first embodiment.

As illustrated in FIG. 5, the cooling element driver according to the first example embodiment may include a timing controller 120, a first driver 170, and a second driver 175.

The timing controller 120 may include a data value extractor 123, an average value calculator 124, and a cooling zone controller 125. The data value extractor 123 may extract a data value for each area (position) for the display panel based on a data signal DATA supplied from the image supply. The average value calculator 124 may match a data value for each area for the display panel supplied from the data value extractor 123 with a data value for each area of a cooling zone, integrate the data value for each area of the cooling zone, and then average the value to calculate an average data value for each area of the cooling zone. The cooling zone controller 125 may generate a cooling zone control signal for separately controlling the cooling zone for each area based on the average data value for each area of the cooling zone supplied from the average value calculator 124.

The first driver 170 and the second driver 175 may generate signals or voltages for driving the cooling element separately disposed for each area based on the cooling zone control signal supplied from the timing controller 120.

Meanwhile, in FIG. 5, the first driver 170 and the second driver 175 are controlled by the timing controller 120 as an example. However, the timing controller 120 may be provided as a separate controller. In addition, FIG. 5 illustrates that the first driver 170 and the second driver 175, which generate signals or voltages for driving the cooling element, are separately configured as an example.

However, at least one of the first driver 170 or the second driver 175 may be included in a driver for driving the display panel. For example, the second driver 175 may be included in the scan driver or generate a signal for driving the cooling element based on a signal output from the scan driver. Accordingly, it should be interpreted that the first driver 170, the second driver 175, and the timing controller 120 may be replaced with existing devices or some or all of the first driver 170, the second driver 175, and the timing controller 120 may be integrated into one entity depending on the implementation method of the device.

As illustrated in FIG. 6, a cooling pixel PD according to the first embodiment may be defined by a first driving line PL1, a second driving line SL1, a first voltage line VDD, and a second voltage line VSS. The cooling pixel PD may include a first transistor T1, a second transistor T2, a capacitor CC, and a cooling element PE.

The first transistor T1 may have a first electrode connected to the first driving line PL1, a second electrode connected to a gate electrode of the second transistor T2, and a gate electrode connected to the second driving line SL1. The first transistor T1 may be turned on in response to a selection signal applied through the second driving line SL1 and may transmit a driving voltage applied through the first driving line PL1 to a first electrode of the capacitor CC.

The capacitor CC may have the first electrode connected to the second electrode of the first transistor T1 and the gate electrode of the second transistor T2, and a second electrode connected to a second electrode of the second transistor T2 and a first electrode of the cooling element PE. The capacitor CC may be charged with a driving voltage transmitted from the first transistor T1.

The second transistor T2 may have a first electrode connected to the first voltage line VDD, the second electrode connected to the first electrode of the cooling element PE, and the gate electrode connected to the second electrode of the first transistor T1. The second transistor T2 may operate based on a driving voltage transmitted from the capacitor CC and generate driving current.

The cooling element PE may have the first electrode connected to the second electrode of the second transistor T2 and the second electrode of the capacitor CC, and a second electrode connected to the second voltage line VSS. The cooling element PE may operate based on driving current generated from the second transistor T2 and perform a cooling function.

Meanwhile, in the first embodiment, the first transistor T1 and the second transistor T2 are n-type as an example. However, the present disclosure is not limited thereto. In addition, the cooling element PE may be a Peltier element that may be current-driven. However, the present disclosure is not limited thereto.

In addition, the first voltage line VDD that is connected to the cooling pixel PD and transmits a first voltage and the second voltage line VSS that transmits a second voltage lower than the first voltage to drive the cooling element PE may be replaced with the high-potential voltage line EVDD and the low-potential voltage line EVSS connected to the pixels of the display panel.

A plurality of cooling pixels PD, each of which has been described above, may be provided, and may be implemented as a cooling panel having a matrix form to correspond to the size (or resolution) of the display panel, which is as follows.

As illustrated in FIG. 7, the cooling panel 160 according to the first embodiment may include cooling pixels PD disposed in a matrix form. The cooling pixels PD are disposed in a matrix form, and at least one cooling pixel PD may be disposed in one area to form cooling zones CZ11 to CZMN divided by area.

The cooling panel 160 may be operated by the first driver 170 and the second driver 175. The first driver 170 and the second driver 175 may operate based on a cooling zone control signal output from the timing controller 120. The first driver 170 may output a driving voltage, and the second driver 175 may output a selection signal.

As a first example, when a first driving voltage is output from the first driver 170 and a first selection signal is output from the second driver 175, a cooling pixel PD disposed in a (1-1)th cooling zone CZ11 may perform a cooling function. As a second example, when an Nth driving voltage is output from the first driver 170 and an Mth selection signal is output from the second driver 175, a cooling pixel PD disposed in an (M−N)th cooling zone CZMN may perform a cooling function.

Meanwhile, the driving voltage and the selection signal may be simultaneously output. However, at least one of the driving voltage or the selection signal may be sequentially output in consideration of line load and power consumption. Further, the cooling zone may be implemented to perform a cooling function in the form of a block in consideration of characteristics of an image displayed on the display panel.

Figure 8:
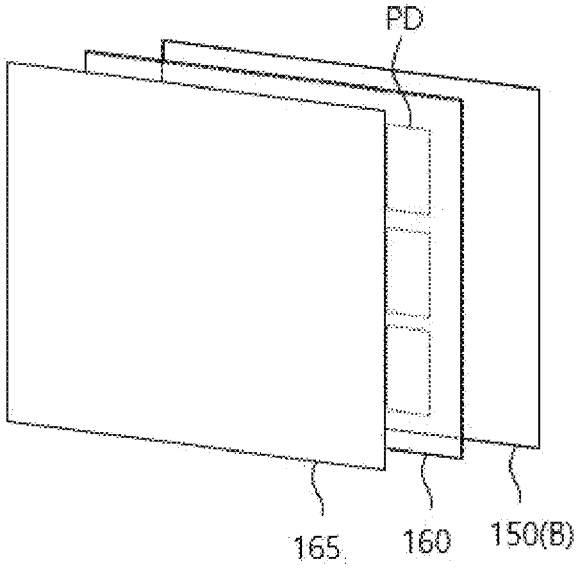
FIG. 8 is a configuration diagram illustrating a display panel including the cooling panel according to the first example embodiment.
Figure 9:
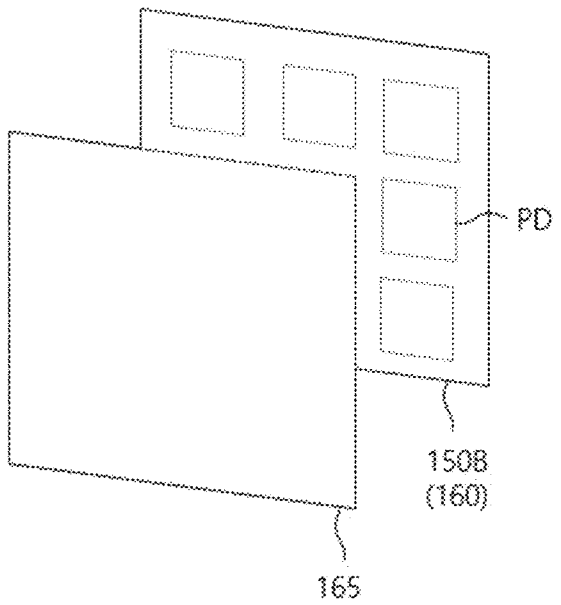
FIG. 9 is a configuration diagram illustrating a display panel including a cooling panel according to a modification of the first example embodiment.

FIG. 8 is a configuration diagram illustrating a display panel including the cooling panel according to the first example embodiment, and FIG. 9 is a configuration diagram illustrating a display panel including a cooling panel according to a modification of the first embodiment.

As illustrated in FIG. 8, the cooling panel 160 on which the cooling pixels PD are disposed may be attached to the display panel 150 according to the first embodiment. The cooling panel 160 may be attached to a back surface 150B of the display panel. The cooling panel 160 may correspond to the size of the display panel 150. The cooling panel 160 may include a heat sink 165. A significantly thin metal material may be selected for the heat sink 165. The heat sink 165 may have a structure such as protrusions or holes to increase heat dissipation characteristics.

As illustrated in FIG. 9, the display panel 150 according to the modification of the first embodiment may include a cooling panel 160 on which cooling pixels PD are disposed. The cooling panel 160 may be formed on the back surface 150B of the display panel 150 rather than on a separate substrate. That is, pixels for displaying an image are formed on a front surface of the display panel 150, and cooling pixels PD are formed on the back surface 150B of the display panel 150 to perform a cooling function. The heat sink 165 may be attached to the back surface 150B of the display panel 150 including the cooling panel 160.

Figure 10:
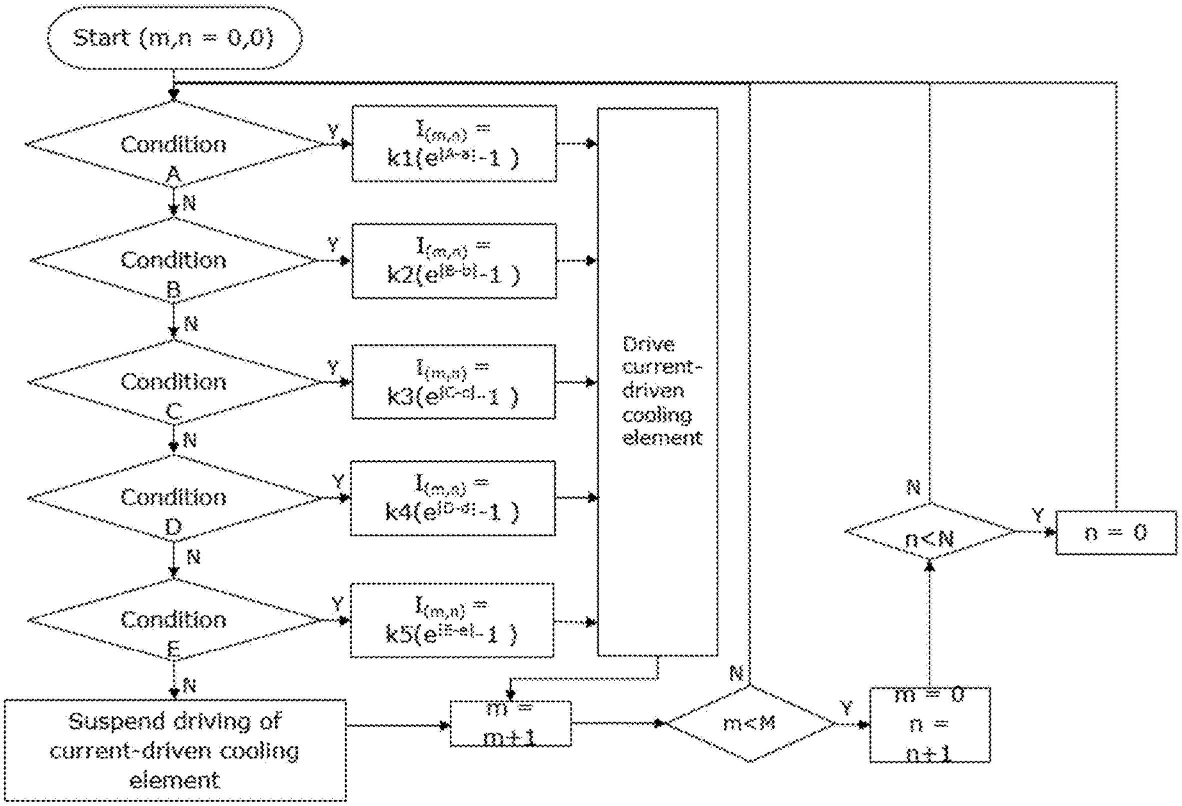
FIG. 10 is a flowchart for describing a method of driving the display panel including the cooling panel according to the first example embodiment.
Figure 11:
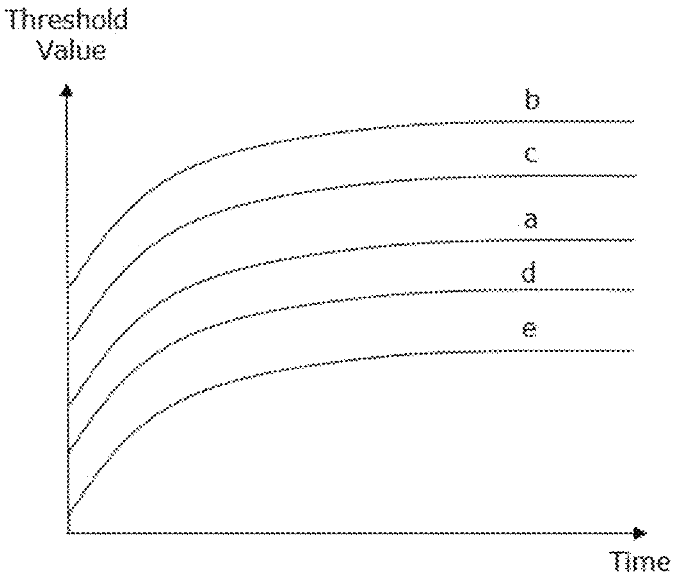
FIG. 11 is an example diagram illustrating a change in a threshold voltage value according to a driving time of the display panel.
Figure 12:
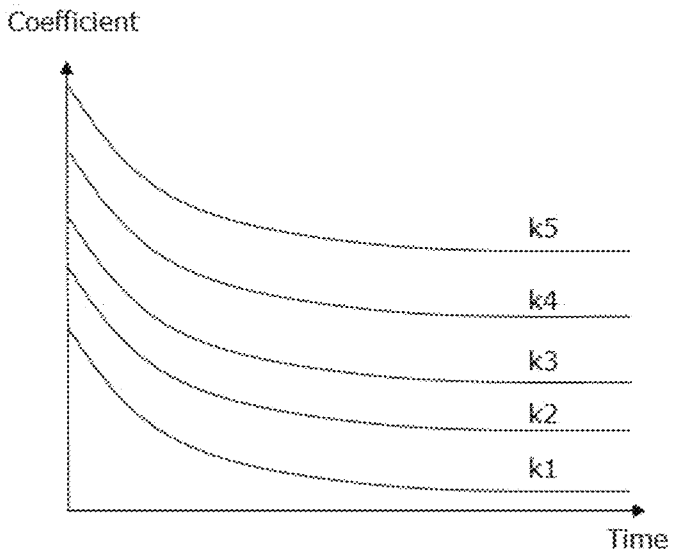
FIG. 12 is an example diagram illustrating a change in a constant value according to a driving time of the display panel.

FIG. 10 is a flowchart for describing a method of driving the display panel including the cooling panel according to the first example embodiment, FIG. 11 is an example diagram illustrating a change in a threshold voltage value according to a driving time of the display panel, and FIG. 12 is an example diagram illustrating a change in a constant value according to a driving time of the display panel. Meanwhile, the threshold voltage value of FIG. 11 and a coefficient value of FIG. 12 are illustrations to describe the driving method illustrated in FIG. 10.

As illustrated in FIGS. 7 to 12, the display panel 150 including the cooling panel 160 may select and drive a cooling zone or suspend driving under the conditions of Condition A to Condition E.

In Condition A, when an average data value A of each cooling zone is greater than or equal to a threshold voltage value a, a driving current is applied to drive the cooling pixel PD based on a value defined in Condition A [$I(m,n)=k1(e^{|A-a|}-1)$].

In Condition B, when p (p being an integer greater than or equal to 2) average data values B of each cooling zone are greater than or equal to a threshold voltage value b, a driving current is applied to drive the cooling pixel PD based on a value defined in Condition B [$I(m,n)=k2(e^{|B-b|}-1)$].

In Condition C, when an average data value C of sub-blocks obtained by dividing each cooling zone into i*j parts (i and j being integers greater than or equal to 2) is greater than or equal to a threshold voltage value c, a driving current is applied to drive the cooling pixel PD based on a value defined in Condition C [$I(m,n)=k3(e^{|C-c|}-1)$].

In Condition D, when an average data value D of a first designated cooling zone (for example, an area where an image or text is displayed for a long time, such as a broadcasting company logo zone) is greater than or equal to a threshold voltage value d, a driving current is applied to drive the cooling pixel PD based on a value defined in Condition D [$I(m,n)=k4(e^{|D-d|}-1)$].

In Condition E, when an average data value E of a second designated cooling zone (for example, a position corresponding to a circuit or a board that generates heat, such as the timing controller) is greater than or equal to a threshold voltage value e, a driving current is applied to drive the cooling pixel PD based on a value defined in Condition E [$I(m,n)=k4(e^{|E-e|}-1)$].

In FIG. 10, "m, n=0, 0" means a cooling zone located at a first start point. Further, in "m<M" and "n<N", M and N mean a cooling zone located at a last end point. In other words, the figure illustrates a flow for controlling the cooling conditions from the cooling zone located at the first start point to the cooling zone located at the last end point. In addition, values (a to e and k1 to k5) illustrated in FIGS. 11 and 12 should be interpreted as an example to show that the cooling zone may be controlled for each condition.

In the first embodiment, driving intensity of the cooling pixel (current-driven cooling element) included in the cooling panel may be adjusted (controlled) in response to characteristics (for example, luminance) of the image displayed on the display panel, and may be separately controlled for each area. For example, in a high-luminance area where heat generation is concentrated, strong cooling may be performed, and in a low-luminance area where heat generation is weak, weak cooling may be performed or a cooling function may be suspended, so that it is possible to minimize or reduce power consumption in addition to performing efficient cooling.

Figure 13:
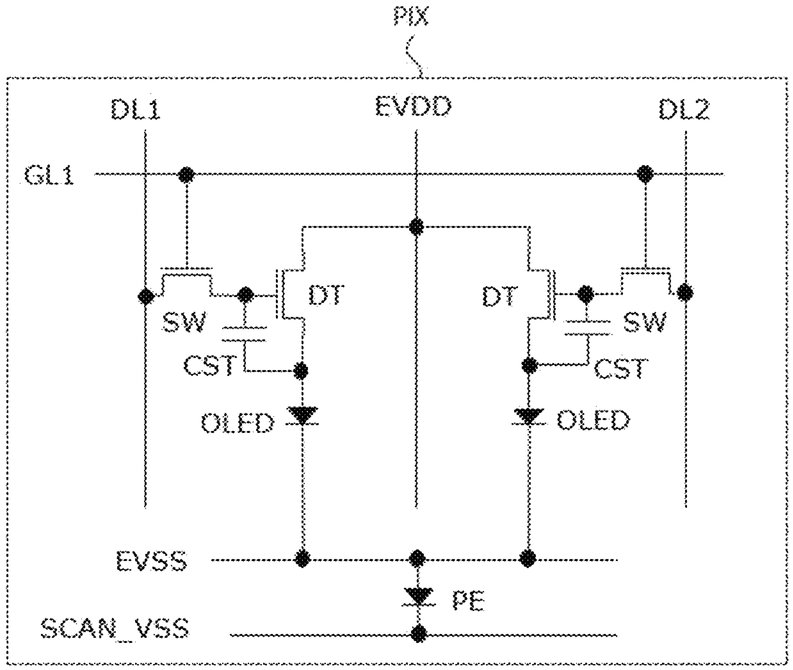
FIG. 13 is a circuit diagram illustrating a pixel including a cooling element according to a second example embodiment.
Figure 14:
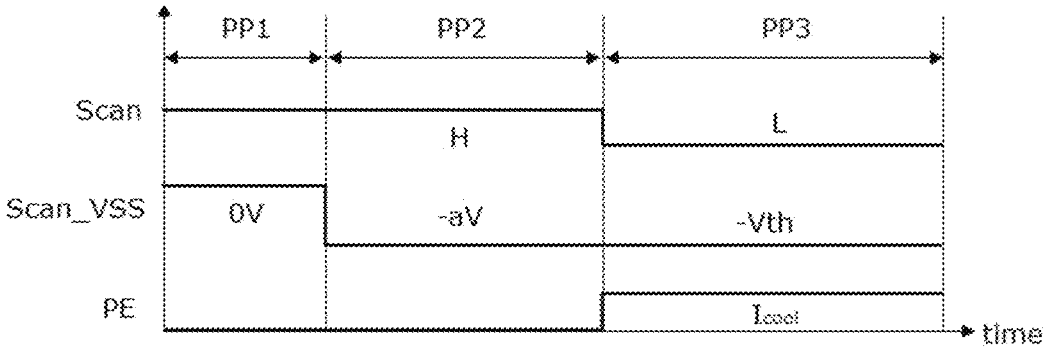
FIG. 14 is a waveform diagram for describing a method of driving the cooling element according to the second example embodiment.
Figure 15:
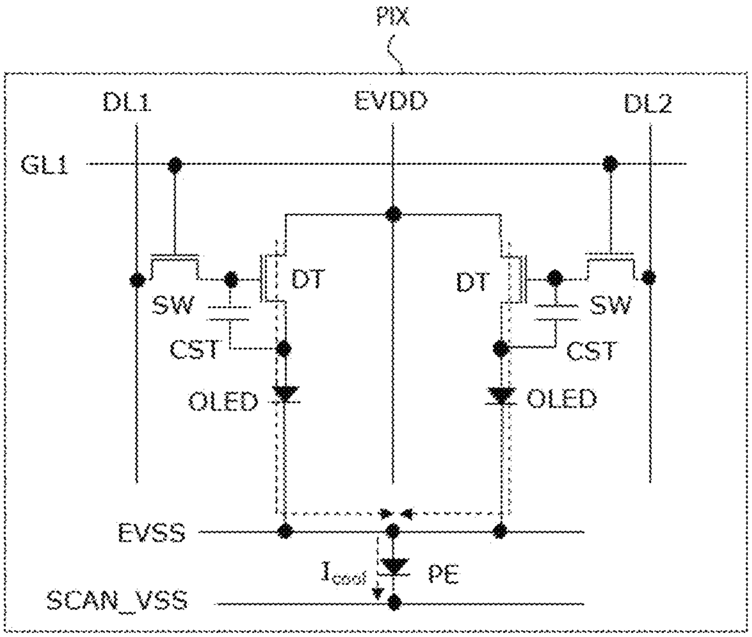
FIG. 15 is an operation state diagram of the pixel including the cooling element according to the second example embodiment.
Figure 16:
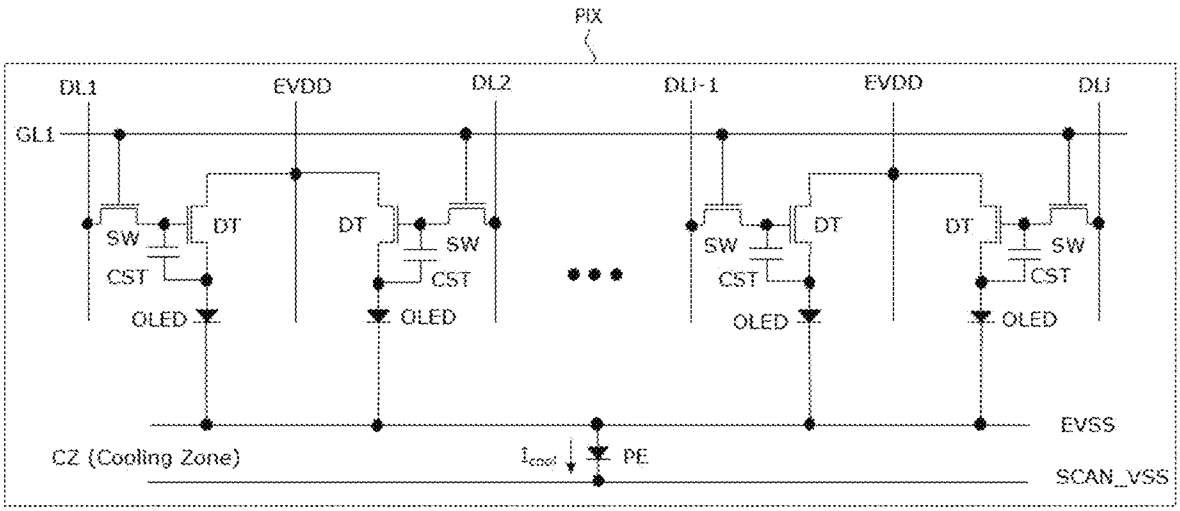
FIG. 16 is a circuit diagram illustrating a pixel including a cooling element according to a modification of the second example embodiment.

FIG. 13 is a circuit diagram illustrating a pixel including a cooling element according to a second example embodiment, FIG. 14 is a waveform diagram for describing a method of driving the cooling element according to the second embodiment, FIG. 15 is an operation state diagram of the pixel including the cooling element according to the second embodiment, and FIG. 16 is a circuit diagram illustrating a pixel including a cooling element according to a modification of the second embodiment.

As illustrated in FIG. 13, the pixel PIX according to the second embodiment may include a cooling element PE. Meanwhile, note that two subpixels of a first subpixel defined by a first data line DL1 and a first gate line GL1 and a second subpixel defined by a second data line DL2 and the first gate line GL1 are represented as one pixel PIX in FIG. 13 for convenience of description.

Subpixels included in the pixel PIX may each include a switching transistor SW, a driving transistor DT, a storage capacitor CST, an organic light-emitting diode OLED, etc.

The switching transistor SW may have a first electrode connected to the data line (for example, DL1 or DL2), a second electrode connected to a gate electrode of the driving transistor DT, and a gate electrode connected to the gate line (for example, GL1). The switching transistor SW may transmit a data voltage applied through the data line to a first electrode of the storage capacitor CST.

The storage capacitor CST may have the first electrode connected to the second electrode of the switching transistor SW and the gate electrode of the driving transistor DT, and a second electrode connected to a low-potential voltage line EVSS. The storage capacitor CST may be charged with a data voltage transmitted from the switching transistor SW.

The driving transistor DT may have a first electrode connected to a high-potential voltage line EVDD, a second electrode connected to an anode of the organic light-emitting diode OLED, and the gate electrode connected to the second electrode of the switching transistor SW and the first electrode of the storage capacitor CST. The driving transistor DT may generate a driving current based on a data voltage stored in the storage capacitor CST.

The organic light-emitting diode OLED may have the anode connected to the second electrode of the driving transistor DT and a cathode connected to the low-potential voltage line EVSS. The organic light-emitting diode OLED may emit light in response to a driving current generated from the driving transistor DT.

The cooling element PE may have a first electrode connected to the low-potential voltage line EVSS and a second electrode connected to a driving signal line SCAN_VSS. The driving signal line SCAN_VSS may transmit a driving voltage causing a threshold voltage of the cooling element PE to be a negative value-Vth or less. The cooling element PE operates in response to a driving voltage applied through the driving signal line SCAN_VSS and may perform a cooling function.

As illustrated in FIGS. 14 and 15, in the pixel PIX according to the second embodiment, a cooling function may be performed by the cooling element PE in a flow of a first period PP1, a second period PP2, and a third period PP3.

A first scan signal Scan applied to the first gate line GL1 may have a high voltage H state during the first period PP1 and the second period PP2 and have a low voltage L state during the third period PP3.

A driving voltage Scan_VSS applied to the driving signal line SCAN_VSS may have a state of a voltage 0 V (or ground voltage) during the first period PP1 and have a state of a negative voltage –aV during the second period PP2 and the third period PP3. In this instance, a voltage causing the threshold voltage of the cooling element PE to be the negative value –Vth or less may be selected as the negative voltage –aV. In addition, a level of the negative voltage –aV may be varied so that the cooling function of the cooling element PE may be controlled.

The first period PP1 may be defined as a non-driving period of the cooling element PE, the second period PP2 may be defined as a driving preparation period of the cooling element PE, and the third period PP3 may be defined as a driving period of the cooling element PE.

During the third period PP3, a driving current Icool may be generated between the low-potential voltage line EVSS and the driving signal line SCAN_VSS based on the negative voltage –aV, which is the driving voltage. The cooling element PE located between the low-potential voltage line EVSS and the driving signal line SCAN_VSS operates in response to the driving current Icool flowing between the low-potential voltage line EVSS and the driving signal line SCAN_VSS during the third period PP3, and may perform a cooling function.

As illustrated in FIG. 16, a pixel PIX according to the modification of the second embodiment may include I (I being an integer greater than or equal to 2) subpixels and one cooling element PE. The cooling element PE may be disposed in a cooling zone CZ defined in the pixel PIX.

The cooling zone CZ may be defined between the low-potential voltage line EVSS and the driving signal line SCAN_VSS. When the number of subpixels included in the pixel PIX is divided in half, the cooling zone CZ may be disposed in a central area corresponding to a center thereof. However, an arrangement position of the cooling zone CZ may be determined based on experiments, simulations, etc. to be able to efficiently dissipate heat generated by the pixel PIX.

Figure 17:
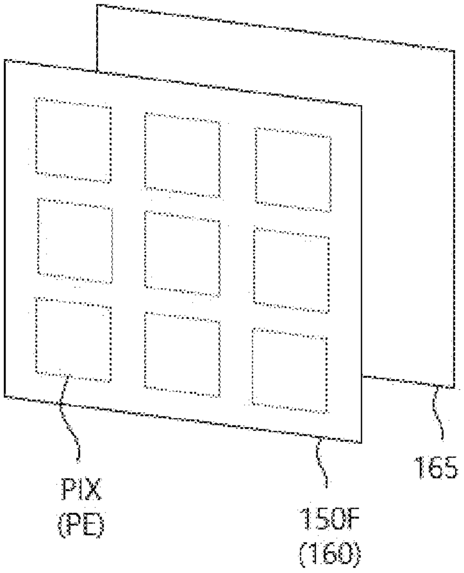
FIG. 17 is a configuration diagram illustrating a display panel having the pixel including the cooling element according to the second example embodiment.
Figure 18:
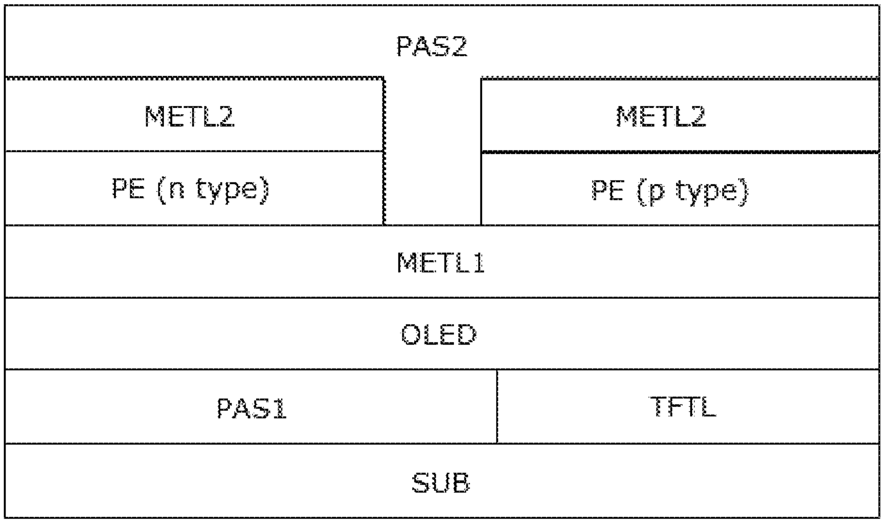
FIG. 18 is a cross-sectional view illustrating a part of the example display panel illustrated in FIG. 17.

FIG. 17 is a configuration diagram illustrating a display panel having the pixel including the cooling element according to the second example embodiment, and FIG. 18 is a cross-sectional view illustrating a part of the example display panel illustrated in FIG. 17.

As illustrated in FIG. 17, the display panel 150 according to the second embodiment may include the pixel PIX including the cooling element PE. The cooling element PE is included in the pixel PIX, and thus may be disposed on a front surface 150F of the display panel 150, that is, in the active area. In addition, a heat sink 165 may be attached to a back surface of the display panel 150.

Meanwhile, the arrangement position and number of cooling elements PE may vary depending on the size or resolution of the display panel 150. For example, one cooling element PE may be disposed in one pixel PIX or one cooling element PE may be disposed in at least two pixels.

In addition, in the display panel 150 according to the second embodiment, unlike the first embodiment, the cooling element PE may be included in the pixel PIX and the cooling element PE may be controlled based on a circuit capable of applying a negative voltage through a driving signal line. Therefore, the first driver 170 and the second driver 175 illustrated in FIG. 5 may be integrated into one driver. Further, the driver may generate and output a driving voltage by varying the negative voltage based on a cooling zone control signal supplied from the timing controller 120 illustrated in FIG. 5.

As illustrated in FIG. 18, the display panel 150 according to the second example embodiment may implement the cooling element PE using a thin film deposition method, similar to the pixel PIX. The display panel 150 on which the cooling element PE is formed may have the following stacked structure.

A thin film transistor layer TFTL and a first protective layer PAS1 may be located on a substrate SUB. The thin film transistor layer TFTL may include a transistor, a capacitor, etc. capable of driving the organic light-emitting diode OLED and the cooling element PE included in the pixel.

The organic light-emitting diode OLED may be located on the thin film transistor layer TFTL and the first transistor layer TFTL. A first metal line layer MET1 may be located on the organic light-emitting diode OLED. The first metal line layer MET1 may form one electrode for driving the cooling element PE.

The cooling element PE may be located on the first metal line layer MET1. The cooling element PE is illustrated as being configured in a diode form divided into n-type and p-type on one side and the other side as an example. However, the present disclosure is not limited thereto. Here, the cooling function of the cooling element PE may be performed on the side where n-type and p-type face each other. For example, the cooling element PE may be implemented based on a Peltier element, and may perform a cooling function based on the Peltier effect, such as absorption or emission of Joule heat and heat energy generated at a junction where current flows.

A second metal line layer MET2 may be located on the cooling element PE. The second metal line layer MET2 may form the other electrode for driving the cooling element PE. In addition, the first metal line layer MET1 and the second metal line layer MET2 may include a touch sensor capable of receiving input by touch. That is, the display panel 150 according to the second embodiment may be implemented in a form that includes a touch panel as well as the cooling element PE.

Figure 19:
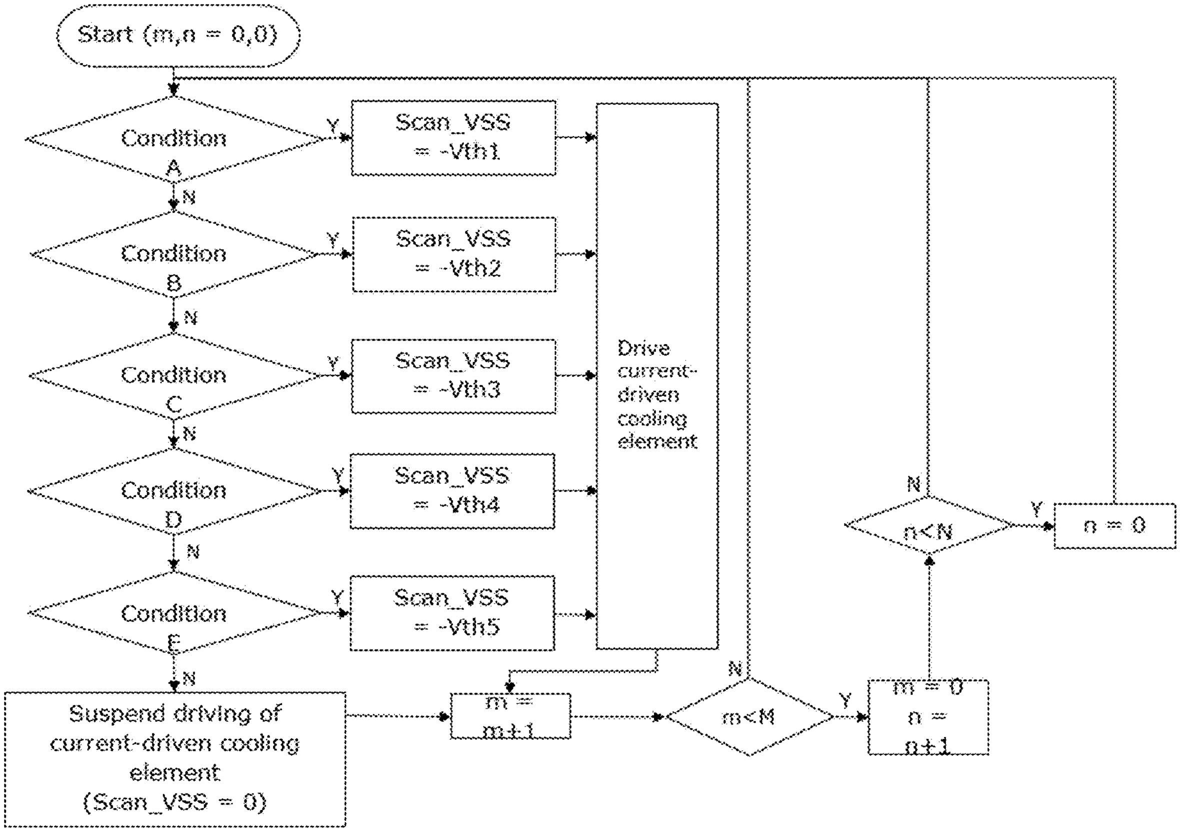
FIG. 19 is a flowchart for describing a method of driving the display panel having the pixel including the cooling element according to the second example embodiment.

FIG. 19 is a flowchart for describing a method of driving the display panel having the pixel including the cooling element according to the second example embodiment.

As illustrated in FIGS. 17 and 19, the display panel 150 having the pixel PIX including the cooling element PE may be driven or driving thereof may be suspended (Scan_VSS=0) under the conditions of Condition A to Condition E.

In Condition A, when an average data value A of each cooling zone is greater than or equal to a threshold voltage value a, a driving voltage is applied to drive the cooling pixel PD based on a value defined in Condition A (Scan_VSS=−Vth1).

In Condition B, when p (p being an integer greater than or equal to 2) average data values B of each cooling zone are greater than or equal to a threshold voltage value b, a driving current is applied to drive the cooling pixel PD based on a value defined in Condition B (Scan_VSS=−Vth2).

In Condition C, when an average data value C of sub-blocks obtained by dividing each cooling zone into i*j parts (i and j being integers greater than or equal to 2) is greater than or equal to a threshold voltage value c, a driving current is applied to drive the cooling pixel PD based on a value defined in Condition C (Scan_VSS=−Vth3).

In Condition D, when an average data value D of a first designated cooling zone (for example, a broadcasting company logo zone) is greater than or equal to a threshold voltage value d, a driving current is applied to drive the cooling pixel PD based on a value defined in Condition D (Scan_VSS=−Vth4).

In Condition E, when an average data value E of a second designated cooling zone (for example, a position corresponding to a circuit or a board that generates heat, such as the timing controller) is greater than or equal to a threshold voltage value e, a driving current is applied to drive the cooling pixel PD based on a value defined in Condition E (Scan_VSS=−Vth5).

In FIG. 19, "m, n=0, 0" means a cooling zone located at a first start point. Further, in "m<M" and "n<N", M and N mean a cooling zone located at a last end point. In other words, the figure illustrates a flow for controlling the cooling conditions from the cooling zone located at the first start point to the cooling zone located at the last end point. In addition, values (Vth1~Vth5) illustrated in FIG. 19 should be interpreted as an example to show that the cooling zone may be controlled for each condition.

As described above, the present disclosure has an effect of being able to reduce heat generation and burn-in problems of the display panel to increase operational reliability of the display panel, as well as increasing maximum luminance based on heat reduction. In addition, the present disclosure has an effect of being able to minimize or reduce power consumption based on an efficient cooling method that may adjust driving intensity of the cooling element according to an image.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:
- a display panel configured to display an image;
- a plurality of cooling elements disposed in a matrix form to cool heat generated by the display panel;
- a driver configured to drive the display panel and the cooling elements; and
- a timing controller configured to control the driver,
- wherein the timing controller is further configured to extract a data value for each area of the display panel based on a data signal and to generate a control signal for driving the cooling elements based on the data value.

2. The display device of claim 1, wherein the driver is further configured to separately drive the cooling elements for each area based on the control signal supplied from the timing controller.

3. The display device of claim 2, wherein driving intensity of the cooling elements for performing a cooling function is configured to be varied in response to the data signal.

4. The display device of claim 1, wherein the cooling elements are located on a cooling panel corresponding to the display panel.

5. The display device of claim 4, wherein the cooling panel comprises:
- a first transistor configured to transmit a driving voltage in response to a selection signal;
- a capacitor charged with the driving voltage;
- a second transistor configured to operate based on the driving voltage stored in the capacitor and to generate a driving current; and
- a plurality of cooling pixels respectively comprising the cooling elements and configured to perform a cooling function in response to the driving current generated by the second transistor, the cooling pixels being disposed in the matrix form.

6. The display device of claim 5, wherein:
- the first transistor has a first electrode connected to a first driving line configured to transmit the driving voltage, a second electrode connected to a gate electrode of the second transistor, and a gate electrode connected to a second driving line configured to transmit the selection signal;

the capacitor has a first electrode connected to the second electrode of the first transistor and the gate electrode of the second transistor, and a second electrode connected to a second electrode of the second transistor and a first electrode of a cooling element among the cooling elements;

the second transistor has a first electrode connected to a first voltage line configured to transmit a first voltage, a second electrode connected to the first electrode of the cooling element, and the gate electrode connected to the second electrode of the first transistor; and the cooling element has the first electrode connected to the second electrode of the second transistor and the second electrode of the capacitor, and a second electrode connected to a second voltage line configured to transmit a second voltage lower than the first voltage.

7. A display device, comprising:

a display panel comprising a pixel configured to display an image;

a cooling element included in the pixel;

a driver configured to drive the display panel and the cooling element; and a timing controller configured to control the driver.

8. The display device of claim 7, wherein the timing controller is further configured to:

extract a data value for each area of the display panel based on a data signal; and generate a control signal for driving the cooling element based on the data value.

9. The display device of claim 8, wherein the cooling element is located between a low-potential voltage line configured to transmit a low-potential voltage to the pixel and a driving signal line configured to transmit a driving voltage generated based on the control signal.

10. The display device of claim 8, wherein driving intensity of the cooling element for performing a cooling function is configured to be varied in response to the data signal.

11. The display device of claim 8, wherein the cooling element is configured to perform a cooling function based on a negative driving voltage output from the driver.

12. The display device of claim 11, wherein the negative driving voltage is configured to be varied in response to the data signal.

* * * * *